United States Patent [19]

Wüst

[11] 4,063,065
[45] Dec. 13, 1977

[54] METHOD AND APPARATUS FOR THE RESISTANCE HEATING OF WIRE PINS

[75] Inventor: Toni Wüst, Cologne, Germany

[73] Assignee: Meyer, Roth & Pastor Maschinenfabrik GmbH, Cologne, Germany

[21] Appl. No.: 636,585

[22] Filed: Dec. 1, 1975

[30] Foreign Application Priority Data

Dec. 4, 1974 Germany .............................. 2457225

[51] Int. Cl.² .............................................. H05B 1/00
[52] U.S. Cl. ................................... 219/162; 148/154; 219/50; 219/156; 219/158
[58] Field of Search .................. 148/150, 154; 219/50, 219/156, 158, 159, 161, 162

[56] References Cited

U.S. PATENT DOCUMENTS

| 2,027,416 | 1/1936 | Blakeslee | 219/50 |
| 2,044,504 | 6/1936 | Kobert | 219/156 |
| 2,856,514 | 10/1958 | Sevlen | 219/156 X |
| 3,082,319 | 3/1963 | Watson | 219/156 |

Primary Examiner—J. V. Truhe
Assistant Examiner—N. D. Herkamp
Attorney, Agent, or Firm—Spencer & Kaye

[57] ABSTRACT

A method for the consecutive resistance heating of sequentially advanced wire pins by means of electrodes positioned on end faces of the pins includes the following steps:

a. connecting in series at least two wire pins to a current source through the electrodes;
b. passing heating current through each wire pin for a number of consecutive heating periods which equal the number of the serially-connected wire pins; and
c. between each heating period removing that wire pin which has been exposed to all consecutive heating periods and, in its stead, introducing a new wire pin.

8 Claims, 1 Drawing Figure

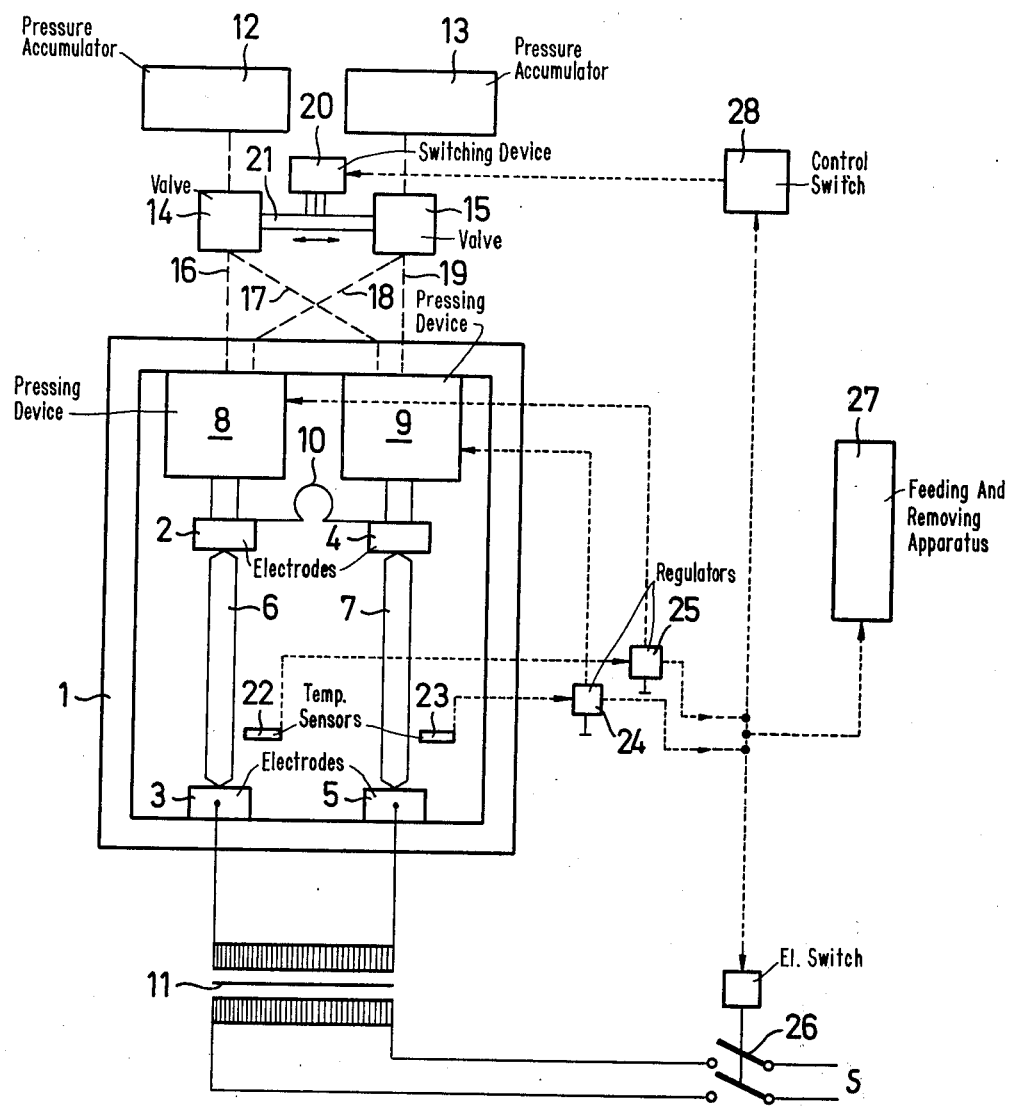

METHOD AND APPARATUS FOR THE RESISTANCE HEATING OF WIRE PINS

BACKGROUND OF THE INVENTION

This invention relates to the manufacture of chains and in particular is concerned with a method and apparatus for heating wire pins by means of electric resistance heating with electrodes that can be positioned on the radial face of the wire pin.

It is generally known to heat wire pins — which are subsequently bent in a warm condition to form chain links — with the aid of the electric resistance heating. In such an operation particular care must be taken regarding the connection between the wire pins and the electrodes since the contact established at the location of connection has great importance regarding the economical nature of the heating process, on the one hand, and the quality of the chain links formed from the heated wire pins, on the other hand. From the electric point of view, it is best to position the electrodes radially on the side of the pin ends. In this manner relatively large electrodes may be applied which make possible a high current transfer and thus result in short heating periods. This arrangement, however, has the disadvantage that the pin sides which receive the electrodes must have a clean and uniform external contour. This requirement makes it necessary that, for example, rolled pins be submitted to subsequent treatment in order to ensure the necessary clean surface. An accuracy of shape can subsequently not be corrected so that imperfect contacts between electrode and pin face result in burns which adversely affect the quality of the chain link subsequently made from the wire pin.

According to another known method, the electrodes are positioned on the end faces of the pins. Since the pins are generally made by means of a sawing or cutting operation, the contact faces are metallically always clean. If, because of surface irregularities, burns occur, the latter are removed during the welding of the bent chain link, so that such burns will not adversely affect the quality of the chain links. This method, however, is disadvantageous with respect to the previously outlined method in that the maximum area of engagement for the electrodes can be no greater than the cross-sectional area of the pin. Since, dependent upon the severing operation with which the individual pins are made from the continuous wire, the end face of the pin ends represents, a contact face which is smaller than the cross section of the pin (this is the case, for example, when the pin is separated from the continuous wire with simultaneous rounding off the pin end), necessarily longer heating periods result. The advantages of this method regarding the quality of the chain links are, however, very significant particularly in the manufacture of heavy-duty, high-quality chains.

SUMMARY OF THE INVENTION

It is an object of the invention to provide an improved method which shortens the heating periods by utilizing the advantages which result from the positioning of the electrodes on the end faces of the wire pins to be heated.

This object and others to become apparent as the specification progresses, are accomplished by the invention, according to which, briefly stated, two pins are electrically connected in series and, in an alternating manner, a new pin is introduced while the current flow is interrupted, so that each pin is first pre-heated and then its heating is completed.

The advantage of the above-outlined method resides in that high-voltage current of relatively small intensity can be used whereby there is ensured a heating of the individual pins, since each pin is traversed by the same current. It is a further advantage of the above-outlined method that despite the limited available contact areas at the end faces of the pins, the heating periods may be significantly shortened since, according to the invention, each newly introduced cold pin is pre-heated, while the previously introduced, already pre-heated pin is heated to completion. Since, here, during the entire heating period, that is, during the pre-heating and the main heating step, the pin is firmly positioned between the electrodes, the once-established contact conditions are not altered. It is a further advantage of the above-outlined method that the pin ends which at the completion of the pre-heating step are, because of the higher transfer resistances at the contact faces, heated to somewhat higher temperatures, can cool as the electrodes cool, while a cold wire pin is introduced. In this manner, melting in the zone of the contact faces is avoided and simultaneously there is achieved a uniform heat distribution over the entire pin length at the end of the main heating step. At the same time, an impermissible deformation of the pin ends — which would lead to disadvantages during the subsequent welding process — is avoided.

According to a further feature of the method according to the invention, the electrodes are positioned on the pin ends with a controllable pressing force. This step has the advantage that the areas of contact, dependent upon the rigidity of the wire pin to be heated, can be exposed to as high a pressure as possible to achieve good contacting conditions which result in a high current flow and thus in a rapid and largely uniform heat distribution over the length of each pin.

According to a further feature of the invention, the pressing force exerted on the pin is higher during the period of preheating than during the period of the main heating step. By controlling the pressing force in this manner during the entire heating period, for the cold and thus significantly resisting wire pin there is provided a high pressing force for achieving contact conditions necessary for a rapid heating, whereas during the subsequent main heating step the pressing force is reduced to such an extent that the wire pin, towards the completion of the main heating period, does not deform under the effect of the pressing force. Such a deformation would lead to difficulties in the subsequent bending step performed on the heated wire pin. According to a further feature of the invention the switching of the pressing force exerted on the pre-heated wire pin always occurs as the pin, after having been exposed to the main heating step, is replaced. In this manner, there is provided a "locking" effect which makes wrong connections impossible.

According to still another feature of the invention, the current flow is interrupted dependent upon the temperature of the pin upon completion of the main heating step. In this manner, it is ensured that the after-connected chain link bending machine always receives pins having the same temperature and thus having uniform deformability which results in uniformly bent chain links. The uniformity of the chain links is of significance particularly in the subsequent welding operation since then for all chains there are provided identical welding conditions resulting eventually in a reliable quality regarding the entire chain.

The apparatus structured according to the invention for performing the above-outlined method has a supporting device for clamping therein the wire pin to be heated and which comprises electrodes adapted to be positioned on the end faces of the wire pin. The electrodes are connected with a current supply. The pin supporting device comprises at least two electrode pairs which can be displaced independently from one another and which are connected in series to the current source.

The method according to the invention can be performed in a simple manner with an apparatus outlined above. The apparatus is particularly advantageous in that the entire heating process may be automated, including the introduction of the cold pin and the removal of the fully heated pin. According to the invention the electrode pair from which the fully heated pin is removed and to which a new cold pin is fed, is opened, whereas the adjacent electrode pair which firmly holds an already pre-heated pin, remains closed. Dependent upon the required throughput or, as the case may be, the available electric power, the apparatus according to the invention may be modified by providing three or more pairs of electrodes in which case then the heating operation is subdivided into a corresponding number of partial heating steps.

According to a further feature of the invention, at least one electrode of an electrode pair is displaceably supported and is connected with a pressing device, the pressing force of which can be controlled. In this manner, a control program may be advantageously effected for the pressing force to ensure that at least during the pin clamping step the electrodes are loaded with a high pressing force so that each time there are provided optimal contact conditions between the end faces of the pins and the electrodes. The pressing force may be generated mechanically by means of appropriate lever assemblies or spring arrangements. According to a particularly advantageous further feature of the invention, this pressing force is generated by a piston-and-cylinder unit which is energized by a pressure medium. Such a pressing device ensures that even through extended work periods the operational conditions remain constant since any wear which may occur has no effect on the pressing force to be exerted.

According to still another feature of the apparatus structured according to the invention, there is provided a control device for regulating the pressing force. The control device causes the application of a larger pressing force to that electrode pair which clamps a pin to be pre-heated. This arrangement ensures good contact conditions and, accordingly, high current flows and consequently, short heating periods.

According to a further feature of the invention the pressing device is yieldingly supported in the pressing direction. In this manner it is achieved that the pressing force once introduced does not increase due to the heat-caused length increase of the clamped wire pin and thus, particularly for the main heating contact, deformations of the clamped wire pin are avoided. Such yielding support may be effected, for example, by means of support springs provided in the electrodes. One of the electrodes is supported by a relatively hard spring whereas the other electrode of the same electrodes pair is connected to a relatively soft spring. The springs are coordinated with one another in such a manner that the hard spring compensates for the length variation during high pressing force, while the electrode supported by the relatively soft spring is pressed against a stop. When the smaller pressing force is applied, the hard spring is practically rigid and the length compensation is taken over by the relatively soft spring.

It is particularly advantageous to provide the yielding support by means of the hydraulically or pneumatically operated pressing device. In such an arrangement means are provided in the pressure supply to ensure that although the support is yielding, the pressing force nevertheless remains constant.

BRIEF DESCRIPTION OF THE DRAWING

The sole FIGURE schematically illustrates a preferred embodiment of the invention.

DESCRIPTION OF THE PREFERRED EMBODIMENT

In a machine stand 1 there are supported two associated electrode pairs 2,3 and 4,5, respectively, which are adapted to clamp a wire pin 6 and 7, respectively. The electrodes 2 and 4 are connected with a pressing device 8,9, by means of which the two electrodes 2,4 can be moved independently from one another in their open position for receiving a wire pin. Subsequently, by means of the pressing device 8,9 the electrodes 2,4 are moved in the closed position in which they press the inserted wire pin against the counter electrodes 3,5. The two electrodes 2,4 are electrically connected to one another by means of a flexible conductor 10, while the two stationary electrodes 3,5 are connected each to one pole of a current source, for example, a secondary winding of a transformer 11. In this manner, the two wire pins 6 and 7 are connected in series with respect to the current flow.

Each pressing device 8 and 9 has a piston-and-cylinder unit for moving the displaceable electrodes 2 and 4, respectively. The piston-and-cylinder units are operated pneumatically or, preferably, hydraulically and provide for a constant pressing force of predeterminable magnitude.

For generating the pressing force there are provided two pressure accumulators 12 and 13 which have different pressure levels and which are in communication with the piston-and-cylinder units of the pressing devices 8 and 9 by means of a respective switch valve 14 and 15. These switch valves are designed in such a manner that both pressing devices 8 and 9 are in communication, through conduits 16,17 and the switch valve 14 with the accumulator 12 which has the higher pressure level. Further, the pressing devices 8 and 9 are connected by means of conduits 18,19 and the switch valve 15 with the accumulator 13 which has the lower pressure level. The two switch valves 14 and 15 are simultaneously operated by means of a switching device 20 (only schematically shown). This mode of operation is indicated in the schematic drawing by a coupling rod 21 which may be moved back and forth in the direction of the double-headed arrow. The switch valves 14 and 15 are constructed in such a manner that in the one position there is communication between the pressing device 8 and the pressure accumulator 12 and simultaneously communication is maintained between the pressing device 9 and the pressure accumulator 13. As the two control valves 14 and 15 are switched, the pressing device 9 will communicate with the pressure accumulator 12 while the pressing device 8 will be connected to the pressure accumulator 13.

In the description which follows the mode of operation of the above-described apparatus will be explained.

As the apparatus is started, two wire pins 6 and 7 are clamped between the electrode pairs 2,3 and 4,5 and the current is turned on. Both pins are traversed by the same current since the pins are connected in series. By virtue of their electric resistance, the two wire pins heat up, whereby the duration of energization is so designed that the temperatures obtained correspond to the desired pre-heating temperature. Thereupon, the current flow is discontinued and the pre-heated pin 6 is removed and a new cold pin is inserted. Subsequently, the current is again switched on and the recently introduced pin 6 is pre-heated whereas the pin 7 which remained in the device is continued to be heated until it reaches the desired temperature associated with the main heating step. Thereafter the electrode pair 4,5 opens and the fully heated pin 7 is removed and fed to an after-connected chain link bending machine while the now preheated pin 6 remains clamped in the electrode pair 2,3. Between the now free electrode pair 4,5 there is inserted a new cold wire pin, the current is again switched on, the newly introduced pin 7 is pre-heated while the already pre-heated pin 6 is submitted to the main heating step. In this manner, the operation continues and, as a result, a fully heated pin can continuously be fed to the chain link bending machine. The duration of current flow is determined by testing to ensure that despite uniform periods of current flow the desired end temperature is reached.

Parallel to the "current program" fixed by the periods of current flow, the pressing devices are controlled by a "pressing program" in such a manner that at all times the newly introduced cold wire pin is submitted to a higher pressure than the already pre-heated pin. At the moment in which, during the reception of a cold pin, the corresponding electrode pair closes and the pin is clamped, the switch valves 14 and 15 are switched in such a manner that the pre-heated pin which is already in the machine, is exposed to the smaller pressure while the newly introduced pin, for example the wire pin 6, is exposed to the higher pressure derived from the pressure accumulator 12. Upon completion of the subsequent heating step, the fully heated wire pin 7 is advanced to the chain link bending machine, while the pre-heated wire pin 6 remains in its clamped position. As a new cold pin is introduced to replace the fully heated wire pin 7, the switch valves 14 and 15, prior to or simultaneously with the restart of the current flow, are switched so that the pre-heated pin 6 is now pressed with the lower pressure of the pressure accumulator 13 while the newly introduced cold pin 7 is exposed to the higher pressure of the pressure accumulator 12. Since the electrodes 2,3,4 and 5 are water-cooled (which is not illustrated in the FIGURE), each time the pre-heated pins are cooled in the zone of the contact areas during pin exchange in the neighboring electrode pair. In this manner, localized temperature peaks which are necessarily generated because of the higher resistance in the zone of the contact area are eliminated by cooling. Since in the conventional severing operations with which the wire pins are separated from a continuous wire, do not, as a rule, result in a perfectly uniform cut and thus in perfectly uniform contact faces, the temperature of the fully heated wire pins may conceivably vary from pin to pin under given constant periods of current flow. In order to obtain a constant "finishing temperature" of the heated wire pin to ensure uniform bending conditions, with each electrode pair there is associated a temperature sensor 22 and 23, respectively, such as a sensor head of a pyrometer. The measuring signal of the pyrometer heads is applied to regulators 24 and 25, respectively, at which the desired temperature value is set. If the predetermined "finishing temperature" is reached is set. If the predetermined "finishing temperature" is reached, for example, in the wire pin 7 (the temperature of the pre-heated wire pin 6 lies far below the predetermined desired temperature so that the pyrometer 22,25 does not respond), the regulator 24 emits a signal for actuating a breaker 26 resulting in the interruption of the current flow. Simultaneously, the only schematically illustrated feeding and removing apparatus 27 is actuated which effects a removal of the fully heated pin 7 and the introduction of a new cold pin into the electrode pair 4,5 to replace the fully heated pin. Further, in response to an additional signal, the pressing device 9 is opened and the switch valves 14,15 are switched by means of a control switch 28 in such a manner that upon clamping of a new pin the pressing device 9 is in communication with the high pressure accumulator 12 while the pressing device 8 which contains the pre-heated pin, is in communication with the low pressure accumulator 13. Subsequently, the pressing device 9 is closed and the current is again switched on. The triggering of this step is effected expediently by the feeding and removing apparatus 27 so that this step is carried out only when it is ensured that a new pin is positioned between the electrode pair 4,5. By means of such a control device the heating apparatus may operate practically in an automatic manner.

While the above-described preferred embodiment comprises two electrode pairs it is feasible to provide in a similar apparatus, three or more electrode pairs in which case then the heating period is accordingly subdivided corresponding to the number of electrode pairs.

The hydraulically or pneumatically operated pressing devices 8 and 9 further provide for the compensation of a heat-caused elongation of the wire pins since, without altering the pressing force, the pressing pistons associated with the electrodes 2 and 4, respectively, are adapted to yield in accordance with the length increase of the wire pin in response to increasing temperature.

It will be understood that the above description of the present invention is susceptible to various modifications, changes and adaptations, and the same are intended to be comprehended within the meaning and range of equivalents of the appended claims.

What is claimed is:

1. A method for the consecutive resistance heating of sequentially advanced wire pins by means of electrodes positioned on end faces of the pins for the manufacture of chain links, comprising the following steps:
    a. connecting in series two wire pins to a current source through two electrode pairs; the electrodes of one electrode pair engaging two ends of one wire pin and the electrodes of the other electrode pair engaging two ends of the other wire pin;
    b. passing heating current through each wire pin for a pre-heating period and a consecutive main heating period;
    c. applying a relatively large pressing force with which the electrodes of one electrode pair are urged against the ends of the pin exposed to said pre-heating period;
    d. concurrently with step (c), applying a relatively small pressing force with which the electrodes of the other electrode pair are urged against the ends of the pin exposed to said main heating period; and e. between each said heating period removing that wire pin which has been exposed to both heating periods and, in its stead, introducing a new wire pin.

2. A method as defined in claim 1, including the step of changing the pressing force for the wire pin subsequent to the pre-heating period and prior to the main heating period; said step of changing the pressing force being performed upon removal of the wire pin already exposed to both heating periods.

3. In an apparatus for the consecutive resistance heating of sequentially advanced wire pins, having a zone for clamping the wire pins to be heated and means supplying heating current; at least two electrode pairs disposed in the zone and connected in series with the current supply means; means for displaceably supporting at least one electrode of each electrode pair; pressing means operatively coupled to each displaceable electrode for exerting a pressing force thereon; the improvement comprising pressing force control means connected to said pressing means simultaneously applying pressing forces of different magnitude to each displaceable electrode by said pressing means.

4. An apparatus as defined in claim 2, wherein the number of said electrode pairs is two; said pressing force control means including means for simultaneously applying a relatively large pressing force to a displaceable electrode of one electrode pair and a relatively small pressing force to a displaceable electrode of the other electrode pair; and switching means for alternatingly applying the relatively large and relatively small pressing forces to the one and the other electrode pair.

5. An apparatus as defined in claim 3, wherein said pressing means includes a piston-and-cylinder unit and means for energizing said unit with a pressure medium.

6. An appparatus as defined in claim 3, further comprising means for yieldingly supporting at least one electrode of each electrode pair for effecting a yielding displacement in the direction of the pressing force.

7. An apparatus as defined in claim 6, wherein the yieldingly supporting means includes a device for providing a yielding support while maintaining the pressing force approximately constant.

8. An apparatus for the consecutive resistance heating of sequentially advanced wire pins, comprising in combination:

a. first and second electrode pairs each having a stationary electrode and a displaceable electrode; each electrode pair being arranged for receiving a separate wire pin to be engaged, at the pin ends, by the stationary electrode and the displaceable electrode of the electrode pair;

b. first and second pressure supply means for simultaneously supplying a relatively high pressure and a relatively low pressure, respectively;

c. first and second pressing devices connected to the displaceable electrodes of said first and second electrode pairs, respectively, for urging the displaceable electrodes into engagement with the respective wire pin with a force derived from the pressures supplied by said first and second pressure supply means;

d. conduit means connecting said first pressure supply means to said first and second pressing devices and further connecting said second pressure supply means to said first and second pressing devices;

e. valve means arranged in said conduit means; said valve means having a first position in which communication is maintained between said first pressure supply means and said first pressing device and between said second pressure supply means and said second pressing device for applying said relatively high pressure to said first pressing device and said relatively low pressure to said second pressing device; said valve means having a second position in which communication is maintained between said first pressure supply means and said second pressing device and between said second pressure supply means and said first pressing device for applying said relatively high pressure to said second pressing device and said relatively low pressure to said first pressing device;

f. heating circuit means connecting said first and second electrode pairs in series for passing the same heating current through the wire pins held in the first and second electrode pairs;

g. sensor means disposed in the zone which accommodates the wire pins for sensing the temperature thereof during heating by the electric current passing therethrough; and h. actuating means connected to said sensor means and said valve means for switching said valve means from one of said positions to the other when said sensor means senses a predetermined temperature.

* * * * *